(12) United States Patent
Xu et al.

(10) Patent No.: US 11,921,221 B2
(45) Date of Patent: Mar. 5, 2024

(54) SYSTEM FOR INTELLIGENTLY LEVELING WITH AUTOMATIC TEMPERATURE CONTROL FUNCTION AND METHOD THEREOF

(71) Applicant: JIANGSU UNIVERSITY OF SCIENCE AND TECHNOLOGY, Zhenjiang (CN)

(72) Inventors: Jing Xu, Zhenjiang (CN); Xiaonan Chang, Zhenjiang (CN); Changwen Yang, Zhenjiang (CN); Yefan Wang, Zhenjiang (CN); Jiayang Gu, Zhenjiang (CN); Yuankai Zhou, Zhenjiang (CN); Xue Zuo, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 0 days.

(21) Appl. No.: 18/259,099

(22) PCT Filed: Nov. 24, 2022

(86) PCT No.: PCT/CN2022/134061
§ 371 (c)(1),
(2) Date: Aug. 24, 2023

(87) PCT Pub. No.: WO2023/155524
PCT Pub. Date: Aug. 24, 2023

(65) Prior Publication Data
US 2023/0393284 A1    Dec. 7, 2023

(30) Foreign Application Priority Data
Feb. 16, 2022   (CN) .......................... 202210139648.1

(51) Int. Cl.
*G01S 19/13*   (2010.01)
*B23K 1/00*    (2006.01)
(Continued)

(52) U.S. Cl.
CPC ................ *G01S 19/13* (2013.01); *B23K 1/00* (2013.01); *G01K 13/00* (2013.01); *G05D 1/0219* (2013.01)

(58) Field of Classification Search
CPC .......... G01S 19/13; B23K 1/00; G01K 13/00; G05D 1/0219
See application file for complete search history.

(56) References Cited

U.S. PATENT DOCUMENTS

| 3,727,947 A | * | 4/1973 | Small | ................... | B60G 17/056 |
| | | | | | 267/64.16 |
| 2009/0277190 A1 | * | 11/2009 | Piette | ................... | B60N 2/5692 |
| | | | | | 62/3.2 |

FOREIGN PATENT DOCUMENTS

| CN | 107552988 A | 1/2018 |
| CN | 208276056 U | 12/2018 |

(Continued)

OTHER PUBLICATIONS

Written Opinion of the International Searching Authority issued in International Application No. PCT/CN2022/134061, dated Jan. 20, 2023, No. 9 pgs.

(Continued)

*Primary Examiner* — Dana Ross
*Assistant Examiner* — Kuangyue Chen
(74) *Attorney, Agent, or Firm* — HAUPTMAN HAM, LLP

(57) ABSTRACT

The present disclosure discloses a system for intelligently leveling with an automatic temperature control function and a method thereof. The system includes a handcart-type leveller, indoor GPS positioning devices, an AGV trolley temperature measuring device and a control system. The control system processes position parameters of the AGV trolley temperature measuring device and the handcart-type leveller; converts the position parameters for the handcart-type leveller into position parameters for a leveling region, controlling the AGV trolley temperature measuring device to arrive at a lower part of the leveling region by a control chip and measuring temperatures in the leveling region;

(Continued)

controlling an operation status of the AGV trolley temperature measuring device and transmitting data with the AGV trolley temperature measuring device. The method of the present disclosure is capable of intelligently controlling leveling temperatures and leveling time in the leveling region according to preset data parameters, thereby having excellent leveling effects.

4 Claims, 2 Drawing Sheets

(51) Int. Cl.
      *G01K 13/00*        (2021.01)
      *G05D 1/00*        (2006.01)
      *G05D 1/02*        (2020.01)

(56) References Cited

FOREIGN PATENT DOCUMENTS

| | | | |
|---|---|---|---|
| CN | 215392094 U | | 1/2022 |
| CN | 114682649 A | * | 7/2022 |
| CN | 114682649 A | | 7/2022 |
| EP | 3591359 A1 | | 1/2020 |

OTHER PUBLICATIONS

International Search Report issued in International Application No. PCT/CN2022/134061, dated Jan. 20, 2023; No. 5 pgs.

* cited by examiner

SYSTEM FOR INTELLIGENTLY LEVELING WITH AUTOMATIC TEMPERATURE CONTROL FUNCTION AND METHOD THEREOF

RELATED APPLICATIONS

The present application is a U.S. National Phase of International Application Number PCT/CN2022/134061 filed Nov. 24, 2022, and claims priority to Chinese Application Number 202210139648.1 filed Feb. 16, 2022.

TECHNICAL FIELD

The present disclosure relates to the technical field of a welding deformation leveling, and in particular to a system for intelligently leveling with an automatic temperature control function and a method thereof.

BACKGROUND

During the construction process of large ships, welding technology is commonly adopted to connect steel plates, which inevitably leads to uneven welding seams at junctions. Therefore, a leveller is required to level the welding seams of the steel plates. In a new process for leveling induction based on a principle of the electromagnetic induction heating, the regions near the welding seams needs to be heated to reach a specific temperature and maintain the temperature for a certain time period to achieve objectives of eliminating internal stress near the welding seams and further smoothing welding regions. However, by using this kind of levellers based on a principle of induction leveling, during a process of leveling welding seams, it is ineluctable to interrupt an upper part of a leveling region, thus making it inconvenient to directly measure temperatures in the leveling region by a temperature measuring device, thereby controlling the temperatures and leveling time in the leveling region. Also, during an operation process of the leveller, temperatures in the leveling region are relatively high, it is also inconvenient to install the temperature measuring device around the leveling region, thereby inevitably having influence on leveling effects. Therefore, the leveling time for leveling welding seams solely depends on experiences of workers in the practical operation, thereby causing situations that the temperatures are too high or requirements are not satisfied.

A patent application (202110386221.7) discloses a method for integrating an automatic induction and leveling for ship plate welding deformation. in which laser radars are installed on an AGV (Automated Guided Vehicle) trolley, and a map is generated by scanning data for the surrounding environment through the laser radars; the AGV trolley is controlled to arrive at the leveling region by planning a starting point and a route of the AGV trolley; the automatic leveling is implemented after arriving at the leveling region in cooperation with a distance sensor carried on the AGV trolley; and the AGV trolley repeats the operations of distances measuring and leveling along a preset route until it reaches the destination. Deficiencies of this kind of leveling method are lacking a control on temperatures in the leveling regions and leveling time, the main reason of which is that: the AGV trolley interrupts the leveling regions during leveling, making it difficult to arrange temperature measuring devices

SUMMARY

The objectives of the present disclosure are to eliminate the deficiencies in the prior art. Provided is a system for intelligently leveling with an automatic temperature control function and a method thereof, which are capable of accurately measuring temperatures in the leveling regions, controlling leveling temperatures and time in the leveling regions, thus improving leveling effects of the leveller.

In order to solve the above-mentioned technical problems, the following technical solutions are adopted in the present disclosure.

Provided is a system for intelligently leveling with an automatic temperature control function in the present disclosure. The system includes the following.

A handcart-type leveller includes a main body of the handcart-type leveller.

Two sets of indoor GPS positioning devices are configured to measure position information of the handcart-type leveller and an AGV trolley temperature measuring device respectively, and to convert the position information of the handcart-type leveller and the AGV trolley temperature measuring device into position parameters. The indoor GPS positioning devices include transmitters and sensors.

The AGV trolley temperature measuring device includes an AGV trolley movement module, a control chip and a temperature measuring module, is capable of controlling the AGV trolley temperature measuring device to move to a specific position by the control chip and measuring a temperature at the specific position.

A control system includes a master device arranged on the handcart-type leveller and capable of presetting leveling temperatures and leveling time in a leveling region; processes the position parameters for the AGV trolley temperature measuring device and the handcart-type leveller; converts the position parameters for the handcart-type leveller into position parameters for the leveling region, controls the AGV trolley temperature measuring device to arrive at a lower part of the leveling region by the control chip to measure temperatures in the leveling region; controls an operation status of the AGV trolley temperature measuring device and transmits data with the AGV trolley temperature measuring device.

A first sensor 4 in the indoor GPS positioning device used for the handcart-type leveller is arranged on a handle of the handcart-type leveller, and configured to measure a position of the handcart-type leveller.

A second sensor 9 in the indoor GPS positioning device used for the AGV trolley temperature measuring device is arranged on the AGV trolley temperature measuring device.

Each set of the indoor GPS positioning devices at least includes two transmitters that are respectively arranged around the handcart-type leveller and the AGV trolley temperature measuring device.

The temperature measuring module is arranged on an upper part of an AGV mobile trolley.

Provided is a method for intelligently leveling with an automatic temperature control function in the present disclosure. The method includes the following steps.

In Step 1, transmitters are arranged around operation regions of a handcart-type leveller and an AGV trolley temperature measuring device, and a first sensor and a second sensor are arranged on the handcart-type leveller and the AGV trolley temperature measuring device to ensure that sensors are capable of simultaneously communicating with two or more than two transmitters while setting related parameters when the AGV trolley temperature measuring device and the handcart-type leveller operate.

In Step 2, the handcart-type leveller is moved to an operation position.

In Step 3, when a button on a master device is pressed, an indoor GPS positioning device is started up, transmitters communicate with the first sensor arranged on the handcart-type leveller, the position information of the handcart-type leveller is converted into position parameters and the position parameters are transmitted to the control system.

In Step 4, since the first sensor is arranged on a handle of the handcart-type leveller, the control system intelligently adds a preset distance d mm from the handle to the leveling region on a basis of the position parameters for the handcart-type leveller, and converts the preset distance d into the position parameters for the leveling region, and a control chip of the AGV trolley temperature measuring device controls to move the AGV trolley temperature measuring device to a lower part of the leveling region.

In Step 5, a position of the AGV trolley temperature measuring device is detected by the control system through the indoor GPS positioning device, the route assistance is provided to the AGV trolley temperature measuring device, the AGV trolley temperature measuring device arrives at the lower part of the leveling region.

In Step 6, the handcart-type leveller begins to operate, the handcart-type leveller being in an operation status is displayed on a display screen of the master device, and a temperature measuring module of the AGV trolley temperature measuring device measures the temperatures in the leveling region at the same time. The temperature information in a detected region is transmitted to the control system by the control chip, and eventually the temperature information is displayed by the display screen of the master device.

In Step 7, when the temperatures in the detected region reach a required temperature $T\,°\,C.$, the control system automatically controls a power of the handcart-type leveller to stabilize the temperatures in the leveling region at $T\,°\,C.$ and maintain for a time period oft s, the handcart-type leveller automatically stops operating after the time oft s. The AGV trolley temperature measuring device is maintained at the lower part of the leveling region, and the temperature measuring module 8 of the AGV trolley temperature measuring device is turned off.

In Step 8, the handcart-type leveller frequently needs to be moved to another operation region in a practical operation, and when pressing the synchronization button, above-mentioned Steps 3 to 7 are automatically repeated.

In Step 9, after a leveling operation in the leveling region is completed, a shut-down button is pressed to return the AGV trolley temperature measuring device to an original position.

Compared with the prior art, the present disclosure has the following advantages and beneficial effects.

1. The system for intelligently leveling with an automatic temperature control function in the present disclosure is capable of intelligently controlling the leveling temperatures and leveling time in the leveling regions in accordance with the preset data parameters and setting different parameters according to various practical situations to improve the leveling effects.
2. The indoor GPS positioning device adopted by the present disclosure is capable of accurately measuring temperatures in the leveling regions from the lower part by the relevant calculations of the control system.
3. A control chip is used to control the temperature measuring module and the RGV trolley movement module in the RGV trolley temperature measuring device provided by the present disclosure, and the chip is capable of communicating data with the control system through a wireless local area network, avoiding the direct control of the temperature measuring device and the RGV trolley movement module by the control system, simplifying the structure of the control system, and improving the operation speed of the entire system.

Figure 1:
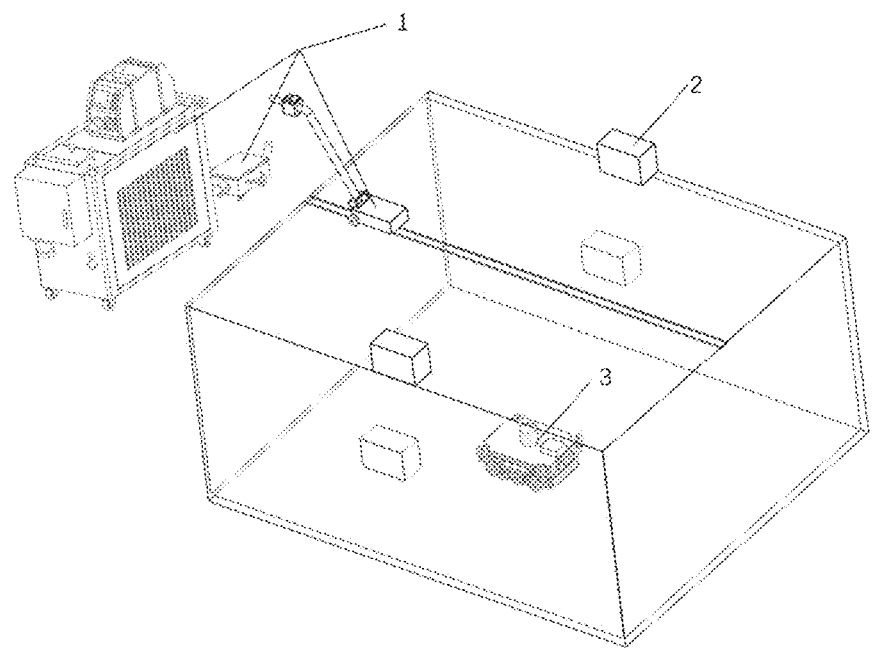
FIG. 1 illustrates an overall schematic structural diagram of a system for intelligently leveling with an automatic temperature control function provided by the present disclosure.

1. Handcart-type leveller; 2. Transmitter; 3. AGV trolley temperature measuring device; 4. First sensor; 5. Master device; 6. AGV trolley movement module; 7. Control chip; 8. Temperature measuring module; 9. Second sensor; 10. button; 11. Display screen.

DETAILED DESCRIPTION OF THE EMBODIMENTS

Provided is a system for intelligently leveling with an automatic temperature control function in the present disclosure. The system includes a handcart-type leveller 1, an indoor GPS (Global Positioning System) positioning device, an AGV (Automatic Guided Vehicle) trolley temperature measuring device 3 and a control system.

In the handcart-type leveller 1, a first sensor 4 is arranged on a handle of the handcart-type leveller 1.

The indoor GPS positioning device includes transmitters 2 and sensors, is configured to convert position information of the handcart-type leveller and AGV trolley temperature measuring device 3 into position parameters.

The AGV trolley temperature measuring device 3 includes an AGV trolley movement module 6, a control chip 7 and a temperature measuring module 8, is capable of controlling the AGV trolley temperature measuring device 3 to move to a specific position and measure a temperature at the specific position by the control chip 7.

The control system includes a master device 5 arranged on the handcart-type leveller 4 and capable of presetting leveling temperatures and leveling time in a leveling region, and controls the AGV trolley temperature measuring device 3 to arrive at a lower part of the leveling region to measure the temperature.

The present disclosure will be further clarified in detail below in conjunction with the accompanying drawings.

As illustrated in FIG. 1, a system for intelligently leveling with an automatic temperature control function provided in the present disclosure includes the handcart-type leveller 4, the indoor positioning device, AGV trolley temperature measuring device 3 and the control system. The handcart-type leveller 1, the transmitter 2 and the AGV trolley temperature measuring device 3. The handcart-type leveller 1 operates at the upper part of the leveling regions, the first sensor 4 is arranged on the handle of the handcart-type leveller 1, configured to detect the positions of the handcart-type leveller 1 and to obtain the positions of the operation regions of the handcart-type leveller through the position of the handcart-type leveller 1. The AGV trolley temperature measuring device 3 is configured to measure the temperature in the operation regions from the lower part. Since the first sensor 4 is arranged on the handle, when determining the positions of the operation regions of the handcart-type leveller 1, the distance from the position of the handle to the operation regions needs to be added to obtain the position parameters for the leveling regions.

Figure 2:
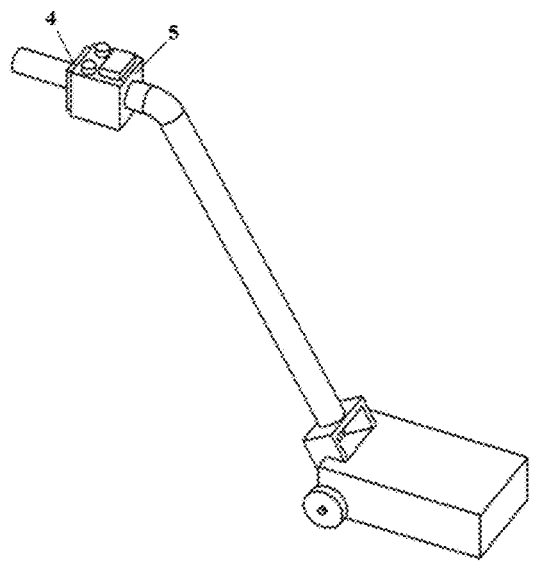
FIG. 2 illustrates a partial schematic structural diagram of a handcart-type leveller of the system for intelligently leveling with the automatic temperature control function provided by the present disclosure.

As illustrated in FIG. 2, the handcart-type leveller 1 of the system for intelligently leveling with the automatic temperature control function provided by the present disclosure includes the first sensor 4 and the master device 5. The first sensor 4 is configured to measure the position parameters for the handcart-type leveller and the master device 5 is configured to control the movement positions, operation status and data interactions of the AGV trolley temperature measuring device 3.

The indoor GPS positioning device includes the transmitter 2 and sensors, the indoor GPS positioning device has two sets, one of which is configured to measure the position information of the handcart-type leveller 1 and another set is configured to measure the position information of the AGV trolley temperature measuring device 3. The sensors are arranged respectively on the handcart-type leveller 1 (the first sensor 4) and the AGV trolley temperature measuring device 2 (the second sensor 9). The transmitters are respectively arranged around the handcart-type leveller 1 and the AGV trolley temperature measuring device 3. When installing the transmitters, it is ensured that the sensors simultaneously communicates with two or more than two transmitters.

Figure 3:
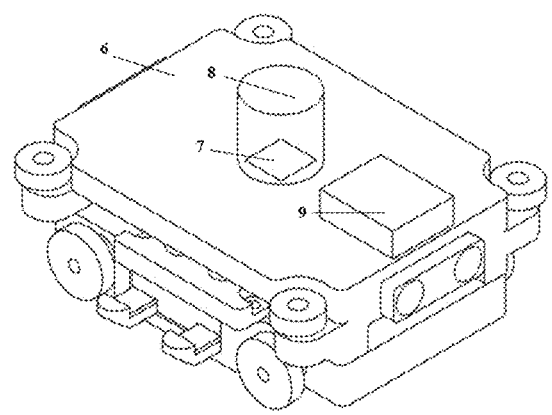
FIG. 3 illustrates a schematic structural diagram of an AGV trolley temperature measuring device of the system for intelligently leveling with the automatic temperature control function provided by the present disclosure.

As illustrated in FIG. 3, the AGV trolley temperature measuring device 3 of the system for intelligently leveling with the automatic temperature control function provided by the present disclosure includes the AGV trolley movement module 6, control chip 7, temperature measuring module 8 and the second sensor 9. The control chip 7 is capable of controlling the AGV trolley movement module 6 to move to the lower part of the operation regions of the handcart-type leveller 1 through the instructions of the control system, controlling the temperature measuring module 8 to measure the temperatures in the operation regions, and eventually outputting the temperature parameters by the display screen 11 on the master device 5. The second sensor 9 is capable of detecting the positions of the AGV trolley temperature measuring device 3 and enable the AGV trolley temperature measuring device 3 to arrive at the specific position. The control chip 7 transmits data with the control system through the wireless local area network, and controls the operation statuses of the AGV trolley movement module 6 and the temperature measuring module 7.

Figure 4:
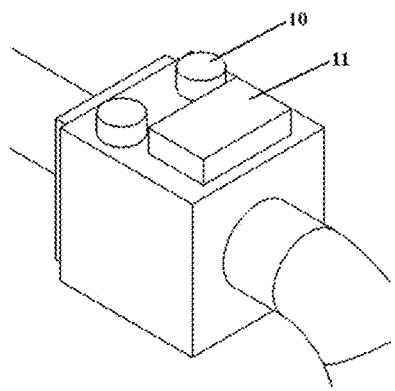
FIG. 4 illustrates a schematic diagram of a master device of the system for intelligently leveling with the automatic temperature control function provided by the present disclosure.

As illustrated in FIG. 4, the master device 5 of the system for intelligently leveling with the automatic temperature control function provided by the present disclosure includes a plurality of buttons 10 and the display 11 that are mainly configured to set and display relevant parameters and control the operation statuses of the handcart-type leveller 1 and the AGV trolley temperature measuring device 3.

Figure 5:
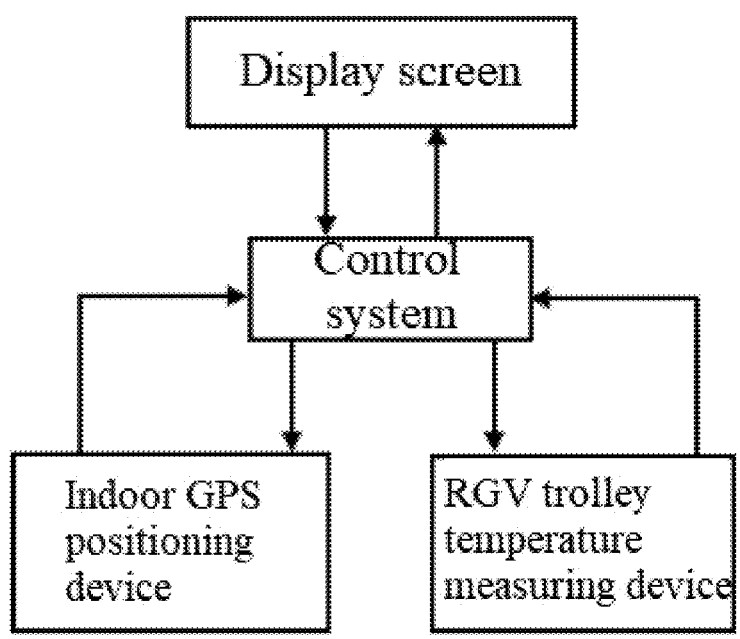
FIG. 5 illustrates a system block diagram of the system for intelligently leveling with the automatic temperature control function provided by the present disclosure.

As illustrated in FIG. 5, the control system of the system for intelligently leveling with the automatic temperature control function provided by the present disclosure includes the master device 5 arranged on the handcart-type leveller, is configured to process the position parameters for the AGV trolley temperature measuring device 3 and handcart-type leveller 1, to convert the position parameters for the handcart-type leveller 1 into the position parameters for the leveling regions and control the AGV trolley temperature measuring device 3 to arrive at the lower part of the leveling regions through the control chip 7 to measure the temperature in the leveling region, and to control the operation status of the AGV trolley temperature measuring device 3 and transmit the data with the AGV trolley temperature measuring device 3.

The operation process lies in the following. The position parameters for the handcart-type leveller 1 are obtained by the first sensor 4, the obtained position data are converted into position parameters for the leveling regions by the control system through the relevant calculations, and the AGV trolley temperature measuring device 3 is controlled to move to the lower part of the leveling regions by the control chip 7. When the handcart-type leveller 1 begins to operate, the temperature measuring module 8 of the AGV trolley temperature measuring device 3 begins to measure the temperature and the control system obtains the temperatures in the leveling regions through the control chip 7 of the AGV trolley temperature measuring device 3. When the temperatures in the leveling regions reach the specific temperature, the control system controls the power of the handcart-type leveller 1 to maintain the temperature in the leveling regions for a certain time.

The trolley of the trolley-type leveller 1 operating along the X-axis direction is taken as an example, assuming that the distance from the first sensor 4 on the handcart-type leveller 1 to the leveling region along the X-axis direction is d mm, the required temperature in the leveling region is T ° C., and the required temperature in the leveling region needs to be maintained for t s.

A method for intelligently leveling with an automatic temperature control function provided by the present disclosure includes the following steps.

In Step 1, transmitters are arranged around operation regions of a handcart-type leveller 1 and an AGV trolley temperature measuring device 3, and a first sensor 4 and a second sensor 9 are respectively arranged on the handcart-type leveller 1 and the AGV trolley temperature measuring device 3 to ensure that sensors are capable of simultaneously communicating with two or more than two transmitters while setting related parameters when the AGV trolley temperature measuring device 3 and the handcart-type leveller 1 operate.

In Step 2, the handcart-type leveller 1 is moved to an operation position.

In Step 3, when a button 10 on a master device 5 is pressed, an indoor GPS positioning device is started up, transmitters 2 communicates with the first sensor 4 arranged on the handcart-type leveller 1, the position information of the handcart-type leveller is converted into position parameters and the position parameters are transmitted to the control system.

In Step 4, since the sensor is arranged on a handle of the handcart-type leveller 1, the control system intelligently adds a preset distance d mm from the handle to the leveling region on a basis of the position parameters for the handcart-type leveller 1, is converted into the position parameters for the leveling region, and the control chip 7 of the AGV trolley temperature measuring device controls to move the AGV trolley temperature measuring device to a lower part of the leveling region.

In Step 5, a position of the AGV trolley temperature measuring device 3 is detected by the control system 5 through the indoor GPS positioning device, and the route assistance is provided to the AGV trolley temperature measuring device 3, the AGV trolley temperature measuring device 3 arrives at the upper part of the leveling region.

In Step 6, the handcart-type leveller 1 begins to operate, the handcart-type leveller 1 being in an operation status is displayed on a display screen 11 of the master device 5, and a temperature measuring module 8 of the AGV trolley temperature measuring device 3 measures the temperatures in the leveling region at the same time. The temperature information in a detected region is transmitted to the control system by the control chip 7, and eventually the temperature information is displayed by the display screen 11 of the master device 5.

In Step 7, when the temperatures in the detected region reach a required temperature T ° C., the control system automatically controls a power of the handcart-type leveller 1 to stabilize the temperatures in the leveling region at T ° C. and maintain for a time period of t s, the handcart-type leveller 1 automatically stops operating after the time of t s. The AGV trolley temperature measuring device 3 is maintained at the lower part of the leveling region, and the temperature measuring module 8 of the AGV trolley temperature measuring device 3 is turned off.

In Step 8, the handcart-type leveller 1 frequently needs to be moved to another operation region in a practical operation, and when pressing the button 10, the above-mentioned Steps 3 to 7 are automatically repeated.

In Step 9, after a leveling operation in the leveling region is completed, the button 10 is pressed to return the AGV trolley temperature measuring device to an original position.

What is claimed is:

1. A system for intelligently leveling with an automatic temperature control function, wherein the system comprises:
    a handcart-type leveller, including a main body of the handcart-type leveller,
    two sets of indoor GPS positioning devices, configured to measure position information of the handcart-type leveller and an AGV trolley temperature measuring device respectively and to convert the position information of the handcart-type leveller and the AGV trolley temperature measuring device into position parameters, including transmitters and sensors;
    a first sensor in one of the two sets of indoor GPS positioning devices used for the handcart-type leveller, arranged on a handle of the handcart-type leveller, configured to measure a position of the handcart-type leveller;
    a second sensor in one of the two sets of indoor GPS positioning devices used for the AGV trolley temperature measuring device, arranged on the AGV trolley temperature measuring device;
    the AGV trolley temperature measuring device, including an AGV trolley movement module, a control chip and a temperature measuring module, capable of controlling the AGV trolley temperature measuring device to move to a specific position by the control chip and measuring a temperature at the specific position; and
    a control system, including a master device arranged on the handcart-type leveller and capable of presetting leveling temperatures and leveling time in a leveling region; processing the position parameters for the AGV trolley temperature measuring device and the handcart-type leveller; converting the position parameters for the handcart-type leveller into position parameters for the leveling region, controlling the AGV trolley temperature measuring device to arrive at a lower part of the leveling region by the control chip to measure temperatures in the leveling region; controlling an operation status of the AGV trolley temperature measuring device and transmitting data with the AGV trolley temperature measuring device; an operation process of the control system is: obtaining the position parameters for the handcart-type leveller by the first sensor, converting obtained position data into the position parameters for the leveling region by the control system through related calculations, and controlling the AGV trolley temperature measuring device to move to the lower part of the leveling region by the control chip; wherein when the handcart-type leveller begins to operate, the temperature measuring module of the AGV trolley temperature measuring device begins to measure temperatures and the control system obtains the temperatures in the leveling region by the control chip of the AGV trolley temperature measuring device, and when the temperatures in the leveling region reach a specific temperature, the control system controls a power of the handcart-type leveller to maintain the temperatures in the leveling region for a certain period of time.

2. The system for intelligently leveling with the automatic temperature control function according to claim 1, wherein each set of the two sets of indoor GPS positioning devices at least includes two transmitters that are respectively arranged around the handcart-type leveller and the AGV trolley temperature measuring device.

3. The system for intelligently leveling with the automatic temperature control function according to claim 1, wherein the temperature measuring module is arranged on an upper part of the AGV trolley temperature measuring device.

4. A method for intelligently leveling with an automatic temperature control function, wherein the method comprises following steps:
    Step 1, arranging, around operation regions of a handcart-type leveller and an AGV trolley temperature measuring device, transmitters arranging, on the handcart-type leveller and the AGV trolley temperature measuring device, a first sensor and a second sensor, and ensuring, when the AGV trolley temperature measuring device and the handcart-type leveller operate, the first sensor and the second sensor are capable of simultaneously communicating with two or more the transmitters while setting related parameters;
    Step 2, moving, to an operation position, the handcart-type leveller;
    Step 3, starting up, when pressing a button on a master device, an indoor GPS positioning device, communicating with the first sensor arranged on the handcart-type leveller by the transmitters, converting position information of the handcart-type leveller into position parameters, and transmitting the position parameters to a control system;
    Step 4, since the first sensor is arranged on a handle of the handcart-type leveller, intelligently adding, by the control system, a preset distance d mm from the handle to a leveling region on a basis of the position parameters for the handcart-type leveller, converting the preset distance d mm into position parameters for the leveling region, and controlling, by a control chip of the AGV trolley temperature measuring device, to move the AGV trolley temperature measuring device to a lower part of the leveling region;

Step 5, detecting, by the control system, a position of the AGV trolley temperature measuring device through the indoor GPS positioning device, providing a route assistance to the AGV trolley temperature measuring device, and the AGV trolley temperature measuring device arriving at the lower part of the leveling region;

Step 6, the handcart-type leveller beginning to operate, displaying, on a display screen of the master device, that the handcart-type leveller is in an operation status, at the same time, measuring, by a temperature measuring module of the AGV trolley temperature measuring device, temperatures in the leveling region, control transmitting, by the control chip, temperature information in a detected region to the control system, and eventually displaying, by the display screen of the master device, the temperature information;

Step 7, when temperatures in the detected region reach a required temperature T ° C., automatically controlling, by the control system, a power of the handcart-type leveller to stabilize the temperatures in the leveling region at T ° C. and maintain for a time period oft s, the handcart-type leveller automatically stopping operating after the time period of t s, maintaining, at the lower part of the leveling region, the AGV trolley temperature measuring device, and turning off the temperature measuring module of the AGV trolley temperature measuring device;

Step 8, the handcart-type leveller frequently needing to be moved to another operation region in a practical operation, and pressing the button to automatically repeat Steps 3 to 7; and Step 9, pressing, after completing a leveling operation in the leveling region, the button to return the AGV trolley temperature measuring device to an original position.

* * * * *